US012811386B2

(12) United States Patent
Murata

(10) Patent No.: US 12,811,386 B2
(45) Date of Patent: Nov. 24, 2026

(54) ELECTRICAL EQUIPMENT AND IN-VEHICLE SYSTEM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Hayaki Murata, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 174 days.

(21) Appl. No.: 18/727,517

(22) PCT Filed: Dec. 27, 2022

(86) PCT No.: PCT/JP2022/048078
§ 371 (c)(1),
(2) Date: Jul. 9, 2024

(87) PCT Pub. No.: WO2023/136128
PCT Pub. Date: Jul. 20, 2023

(65) Prior Publication Data

US 2025/0174977 A1 May 29, 2025

(30) Foreign Application Priority Data

Jan. 12, 2022 (JP) ................................ 2022-003272

(51) Int. Cl.
*H02H 3/20* (2006.01)
*B60R 16/03* (2006.01)

(52) U.S. Cl.
CPC ............. *H02H 3/202* (2013.01); *B60R 16/03* (2013.01)

(58) Field of Classification Search
CPC ........ H02H 3/202; H02H 3/087; H02H 11/00; B60R 16/03; B60R 16/02
(Continued)

(56) References Cited

U.S. PATENT DOCUMENTS

2003/0197543 A1* 10/2003 Imai ................. H03K 17/04123 327/427
2018/0023494 A1* 1/2018 Watanabe ................ G01D 3/08 123/623

FOREIGN PATENT DOCUMENTS

JP 2001-005521 A 1/2001
JP 2004148869 A * 5/2004
(Continued)

OTHER PUBLICATIONS

International Search Report, Application No. PCT/JP2022/048078, mailed Mar. 20, 2023. ISA/Japan Patent Office.

*Primary Examiner* — Sreeya Sreevatsa
(74) *Attorney, Agent, or Firm* — Brooks Kushman P.C.

(57) ABSTRACT

Electrical equipment is mounted in a vehicle. A ground terminal (first connection unit) is connected to a body of the vehicle. An equipment connector (second connection unit) is connected to a switch device (external equipment). A connection switch is connected between the ground terminal and the equipment connector. When the connection switch is on, a current flows through the equipment connector, the connection switch, and the ground terminal in this order. A switching circuit switches the connection switch from on to off when a voltage between the ground terminal and the equipment connector is greater than or equal to a predetermined voltage.

9 Claims, 4 Drawing Sheets

(58) Field of Classification Search
USPC .......................................................... 361/91.1
See application file for complete search history.

(56) References Cited

FOREIGN PATENT DOCUMENTS

| | | | | |
|---|---|---|---|---|
| JP | 2010-105411 | A | | 5/2010 |
| JP | 2017060032 | A | * | 3/2017 |

* cited by examiner

ELECTRICAL EQUIPMENT AND IN-VEHICLE SYSTEM

CROSS-REFERENCE TO RELATED APPLICATIONS

This application is the U.S. national stage of PCT/JP2022/048078 filed on Dec. 27, 2022, which claims priority of Japanese Patent Application No. JP 2022-003272 filed on Jan. 12, 2022, the contents of which are incorporated herein.

TECHNICAL FIELD

The present disclosure relates to electrical equipment and an in-vehicle system.

BACKGROUND

JP 2010-105411A discloses electrical equipment mounted in a vehicle. One end of each of a signal line and a ground line is connected to the electrical equipment. The electrical equipment includes a ground terminal that is grounded. Inside the electrical equipment, the ground terminal is connected to one end of a ground line. The electrical equipment outputs, via the signal line, a signal with respect to a potential of the ground line as a reference potential.

Regarding JP 2010-105411A, in the event of a short to power in which a positive electrode of a battery of the vehicle is connected to the ground line, it is likely that an overcurrent flows into the electrical equipment from the ground line. The overcurrent that has flown through the electrical equipment may damage components inside the electrical equipment.

The present disclosure has been made in view of such circumstances, and it is an object of the disclosure to provide electrical equipment capable of preventing the inflow of an overcurrent via a conductive wire, and an in-vehicle system including the electrical equipment.

SUMMARY

Electrical equipment according to an aspect of the present disclosure is electrical equipment configured to be mounted in a vehicle, including: a first connection unit configured to be connected to a body of the vehicle; a second connection unit configured to be connected to external equipment; a switch configured to be connected between the first connection unit and the second connection unit; and a switching circuit configured to switch the switch on or off, wherein, when the switch is on, a current flows through the second connection unit, the switch, and the first connection unit in this order, and the switching circuit switches the switch from on to off when a voltage between the first connection unit and the second connection unit is greater than or equal to a predetermined voltage.

An in-vehicle system according to an aspect of the present disclosure is an in-vehicle system including: electrical equipment; and second electrical equipment, the electrical equipment being configured to output a voltage to the second electrical equipment, or the second electrical equipment being configured to output a voltage to the electrical equipment, wherein the electrical equipment includes: a first connection unit configured to be connected to a body of a vehicle; a second connection unit configured to be connected to the second electrical equipment; a switch configured to be connected between the first connection unit and the second connection unit; and a switching circuit configured to switch the switch on or off, wherein, when the switch is on, a current flows through the second connection unit, the switch, and the first connection unit in this order, and the switching circuit switches the switch from on to off when a voltage between the first connection unit and the second connection unit is greater than or equal to a predetermined voltage.

Effects of the Present Disclosure

According to the above-described aspects, it is possible to prevent the inflow of an overcurrent via a conductive wire.

DETAILED DESCRIPTION OF PREFERRED EMBODIMENTS

Figure 1:
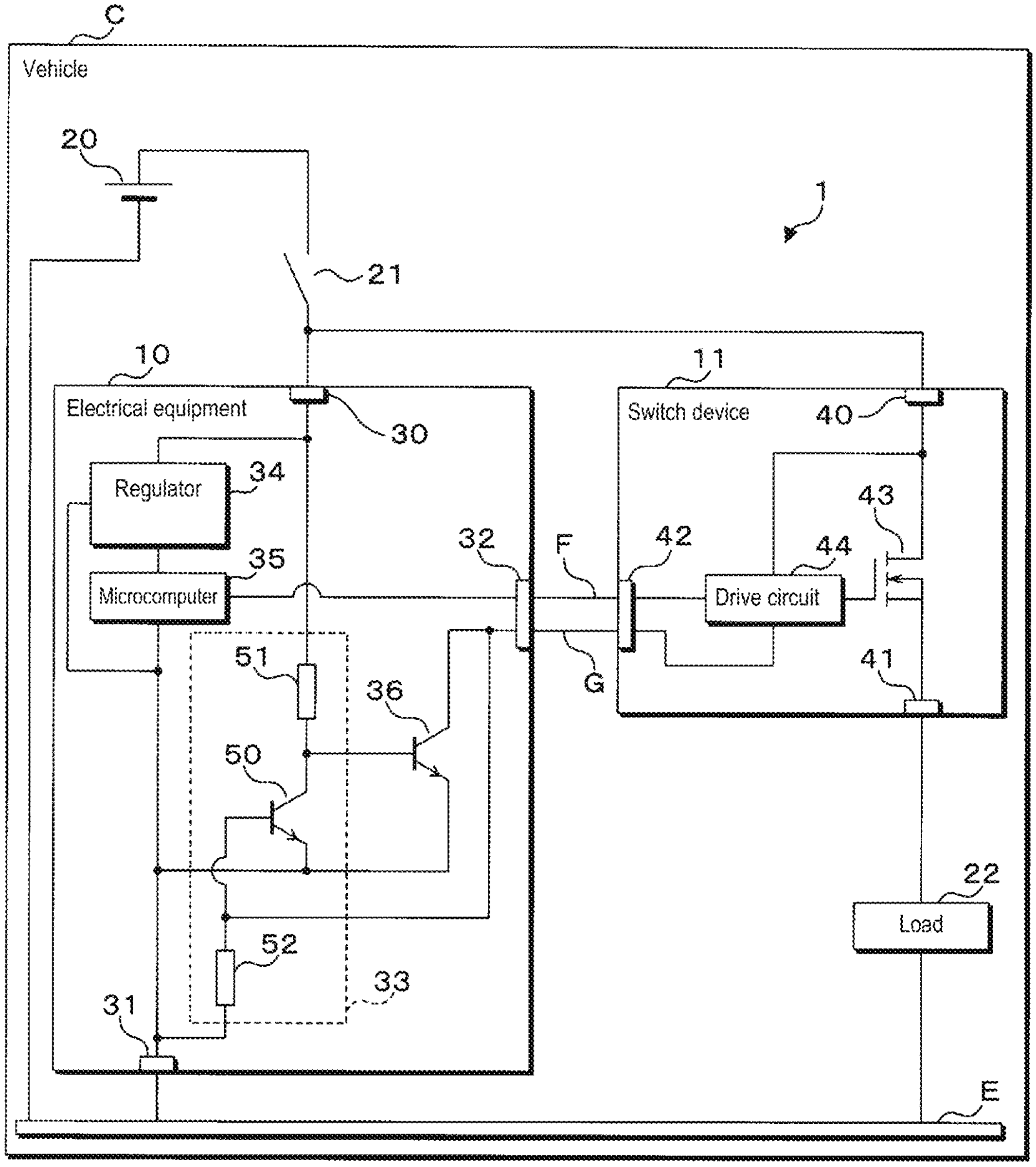
FIG. 1 is a block diagram showing the configuration of a relevant portion of an in-vehicle system according to Embodiment 1.

First, embodiments of the present disclosure will be listed and described. At least some of the embodiments described below may be combined freely.

Electrical equipment according to an aspect of the present disclosure is electrical equipment configured to be mounted in a vehicle, including: a first connection unit configured to be connected to a body of the vehicle; a second connection unit configured to be connected to external equipment; a switch configured to be connected between the first connection unit and the second connection unit; and a switching circuit configured to switch the switch on or off, wherein, when the switch is on, a current flows through the second connection unit, the switch, and the first connection unit in this order, and the switching circuit switches the switch from on to off when a voltage between the first connection unit and the second connection unit is greater than or equal to a predetermined voltage.

According to the above-described aspect, in the event of a short to power in which a positive electrode of a direct current power supply whose negative electrode is connected to the body is connected to a conductive wire between the second connection unit and the external equipment, the voltage between the first connection unit and the second connection unit is greater than or equal to the predetermined voltage, and the switch is switched from on to off. This prevents the inflow of an overcurrent via the conductive wire.

Electrical equipment according to an aspect of the present disclosure further includes an electronic component configured to output or detect a voltage with respect to a potential of the first connection unit as a reference potential.

According to the above-described aspect, the electronic component is, for example, a microcomputer that outputs or detects a voltage with respect to the potential of the first connection unit as a reference.

Electrical equipment according to an aspect of the present disclosure further includes a substrate on which the switch and the switching circuit are disposed, wherein the substrate is connected to the external equipment.

According to the above-described aspect, the substrate is connected to the external equipment by the conductive wire, and it is therefore highly likely that a short to power of the conductive wire occurs. There is a high need for the function for preventing the inflow of an overcurrent via the conductive wire.

In electrical equipment according to an aspect of the present disclosure, the switch is switched from on to off when a voltage between an output end from which a current is output, and a control end is less than a threshold, the switching circuit includes a second switch configured to be connected between the output end and the control end of the switch, and the second switch is switched from off to on when the voltage between the first connection unit and the second connection unit is greater than or equal to the predetermined voltage.

According to the above-described aspect, the second switch is switched on when the voltage between the first connection unit and the second connection unit is greater than or equal to the predetermined voltage. Thus, the voltage between the output end and the control end of the switch is lowered to a 0 V, which is less than the threshold. Consequently, the switch is switched off.

An in-vehicle system according to an aspect of the present disclosure is an in-vehicle system including: electrical equipment; and second electrical equipment, the electrical equipment being configured to output a voltage to the second electrical equipment, or the second electrical equipment being configured to output a voltage to the electrical equipment, wherein the electrical equipment includes: a first connection unit configured to be connected to a body of a vehicle; a second connection unit configured to be connected to the second electrical equipment; a switch configured to be connected between the first connection unit and the second connection unit; and a switching circuit configured to switch the switch on or off, wherein, when the switch is on, a current flows through the second connection unit, the switch, and the first connection unit in this order, and the switching circuit switches the switch from on to off when a voltage between the first connection unit and the second connection unit is greater than or equal to a predetermined voltage.

According to the above-described aspect, in the event of a short to power in which a positive electrode of a direct current power supply whose negative electrode is connected to the body is connected to a conductive wire between the second connection unit and the external equipment, the voltage between the first connection unit and the second connection unit is greater than or equal to the predetermined voltage, and the switch of the electrical equipment is switched from on to off. Consequently, the inflow of an overcurrent into the electrical equipment via the conductive wire is prevented.

In an in-vehicle system according to an aspect of the present disclosure, the electrical equipment includes a substrate on which the switch and the switching circuit are disposed, the second electrical equipment includes a second substrate, and the substrate is connected to the second substrate.

According to the above-described aspect, the substrate is connected to the second substrate by a conductive wire. Therefore, it is highly likely that a short to power of the conductive wire occurs. Consequently, in relation to the electrical equipment, there is a high need for the function for preventing the inflow of an overcurrent via the conductive wire.

Specific examples of an in-vehicle system according to embodiments of the present disclosure will be described below with reference to the drawings. It should be noted that the present disclosure is not limited to these examples, but is defined by the claims, and is intended to include all modifications which fall within the scope of the claims and the meaning and scope of equivalents thereof.

Embodiment 1

Configuration of In-Vehicle System

FIG. 1 is a block diagram showing the configuration of a relevant portion of an in-vehicle system 1 according to Embodiment 1. The in-vehicle system 1 is mounted in a vehicle C. Additionally, a direct current power supply 20, a power switch 21, and a load 22 are mounted in the vehicle C. The in-vehicle system 1 includes electrical equipment 10 and a switch device 11. The direct current power supply 20 is a battery, for example. The power switch 21 is switched on, for example, when an ignition power supply or an accessory power supply is switched on. In this configuration, the power switch 21 is switched off when the ignition power supply or the accessory power supply is switched off.

The electrical equipment 10 includes a power supply terminal 30, a ground terminal 31, and an equipment connector 32. The switch device 11 includes an input terminal 40, an output terminal 41, a device connector 42, a power feeding switch 43, and a drive circuit 44. The power feeding switch 43 is an N-channel field effect transistor (FET). When the power feeding switch 43 is on, the resistance value between a drain and a source thereof is sufficiently small. Accordingly, a current can flow via the drain and the source. When the power feeding switch 43 is off, the resistance value between the drain and the source is sufficiently large. Accordingly, no current will flow via the drain and the source. The drive circuit 44 switches the power feeding switch 43 on or off.

A negative electrode of the direct current power supply 20 is connected to a body E of the vehicle C. The body E is a conductor. Connection to the body E provides grounding. A positive electrode of the direct current power supply 20 is connected to one end of the power switch 21. The other end of the power switch 21 is detachably connected to the power supply terminal 30 of the electrical equipment 10, and is detachably connected to the input terminal 40 of the switch device 11. The ground terminal 31 of the electrical equipment 10 is connected to the body E. The ground terminal 31 functions as a first connection unit. One end of the load 22 is detachably connected to the output terminal 41 of the switch device 11. The other end of the load 22 is connected to the body E. The equipment connector 32 of the electrical equipment 10 is detachably connected to one end of each of a signal line F and a ground line G. The other end of each of the signal line F and the ground line G is detachably connected to the device connector 42 of the switch device 11. The signal line F and the ground line G are conductive wires. The equipment connector 32 is connected to the device connector 42 by the signal line F and the ground line G. The switch device 11 functions as external equipment and second electrical equipment. The equipment connector 32 functions as a second connection unit.

Inside the switch device 11, the drain and the source of the power feeding switch 43 are connected to the input terminal 40 and the output terminal 41, respectively. When the power switch 21 is on, a current flows, from the positive electrode of the direct current power supply 20, through the power switch 21, the electrical equipment 10, the body E, and the negative electrode of the direct current power supply 20 in this order. Thus, power is supplied to the electrical equipment 10. While power is supplied to the electrical equipment 10, the electrical equipment 10 is activated. The electrical equipment 10 instructs the drive circuit 44 of the switch device 11 to switch the power feeding switch 43 on or off.

When the power switch 21 and the power feeding switch 43 are on, a current flows, from the positive electrode of the direct current power supply 20, through the power switch 21, the input terminal 40, the power feeding switch 43, the output terminal 41, the load 22, the body E, and the negative electrode of the direct current power supply 20 in this order. Thus, power is supplied to the load 22. When the power switch 21 or the power feeding switch 43 is off, the flow of a current via the power feeding switch 43 is stopped. Accordingly, the supply of power from the direct current power supply 20 to the load 22 is stopped.

The load 22 is a lamp, for example. While the direct current power supply 20 supplies power to the load 22, the load 22 is activated. When the supply of power from the direct current power supply 20 to the load 22 is stopped, the load 22 is deactivated. The electrical equipment 10 and the switch device 11 control the supply of power from the direct current power supply 20 to the load 22. When the power switch 21 is off, the supply of power from the direct current power supply 20 to the electrical equipment 10 is stopped. In this case, the electrical equipment 10 is deactivated.

Configurations of Electrical Equipment 10 and Switch Device 11

The electrical equipment 10 includes a switching circuit 33, a regulator 34, a microcomputer 35, and a connection switch 36, in addition to the power supply terminal 30, the ground terminal 31, and the equipment connector 32. The switching circuit 33 includes a circuit switch 50, a first circuit resistor 51, and a second circuit resistor 52. The connection switch 36 and the circuit switch 50 are NPN bipolar transistors.

The power supply terminal 30 is connected to one end of the first circuit resistor 51 of the switching circuit 33, and the regulator 34. Inside the switching circuit 33, the other end of the first circuit resistor 51 is connected to a collector of the circuit switch 50. The circuit switch 50 functions as a second switch. A base of the circuit switch 50 is connected to one end of the second circuit resistor 52. A connection node between the collector of the circuit switch 50 and the first circuit resistor 51 is connected to a base of the connection switch 36. An emitter and a collector of the connection switch 36 are connected to the ground terminal 31 and the equipment connector 32, respectively. An emitter of the circuit switch 50 is connected to a connection node between the emitter of the connection switch 36 and the ground terminal 31. The other end of the second circuit resistor 52 is connected to the ground terminal 31.

The regulator 34 is further connected to the ground terminal 31 and the microcomputer 35. The microcomputer 35 is further connected to the ground terminal 31 and the equipment connector 32. A connection node between the equipment connector 32 and the collector of the connection switch 36 is connected to a connection node between the base of the circuit switch 50 and the second circuit resistor 52.

In the switch device 11, a gate of the power feeding switch 43 is connected to the drive circuit 44. The drive circuit 44 is further connected to a connection node between the input terminal 40 and the power feeding switch 43, and the device connector 42.

The regulator 34 and the first circuit resistor 51 are connected to the power switch 21 via the power supply terminal 30. The regulator 34, the microcomputer 35, the emitter of the connection switch 36, the emitter of the circuit switch 50, and the other end of the second circuit resistor 52 are connected to the body E via the ground terminal 31. The microcomputer 35 is connected to the signal line F via the equipment connector 32. The collector of the connection switch 36, the base of the circuit switch 50, and one end of the second circuit resistor 52 are each connected to the ground line G via the equipment connector 32. The drive circuit 44 is separately connected to each of the signal line F and the ground line G via the device connector 42. The drain of the power feeding switch 43 and the drive circuit 44 are each connected to the power switch 21 via the input terminal 40. The source of the power feeding switch 43 is connected to the load 22 via the output terminal 41.

Figure 2:
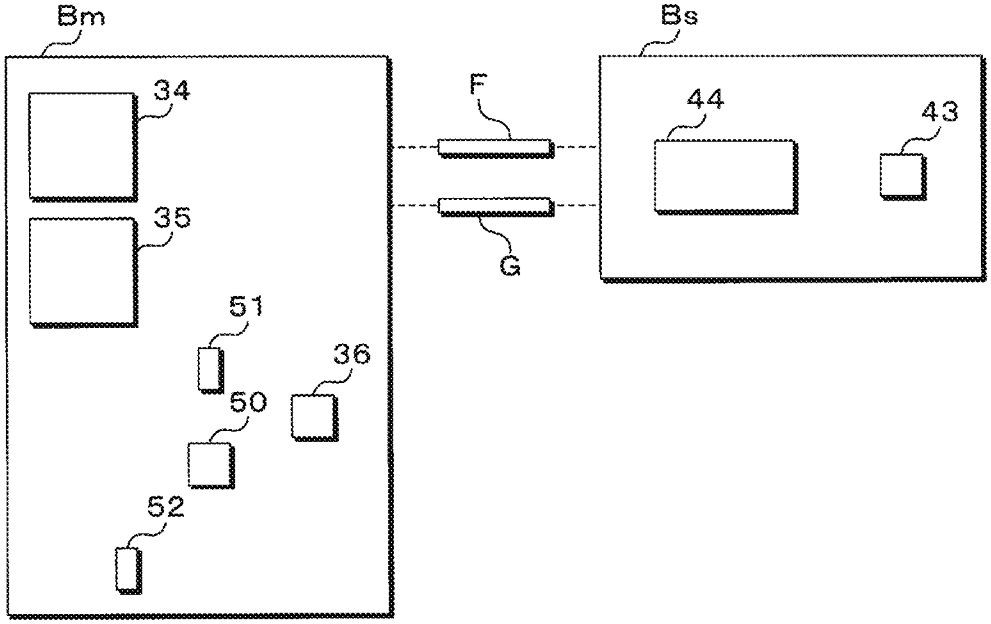
FIG. 2 is a plan view of electrical equipment and a switch device.

FIG. 2 is a plan view of the electrical equipment 10 and the switch device 11. The electrical equipment 10 and the switch device 11 include an equipment substrate Bm and a device substrate Bs, respectively. Each of the equipment substrate Bm and the device substrate Bs has a rectangular plate shape. The regulator 34, the microcomputer 35, the connection switch 36, the circuit switch 50, the first circuit resistor 51, and the second circuit resistor 52 are disposed on a wide surface of the equipment substrate Bm. Each of the regulator 34 and the microcomputer 35 is an integrated circuit element, for example. In relation to a plate, a wide surface is a surface different from an end face. The power feeding switch 43 and the drive circuit 44 are disposed on a wide surface of the device substrate Bs. The drive circuit 44 is an integrated circuit element, for example.

The equipment substrate Bm and the device substrate Bs are connected by the signal line F. The equipment substrate Bm and the device substrate Bs are further connected by the ground line G. Note that in FIG. 2, the illustration of the power supply terminal 30, the ground terminal 31, the equipment connector 32, the input terminal 40, the output terminal 41, and the device connector 42 has been omitted. The power supply terminal 30, the ground terminal 31, and the equipment connector 32 are disposed on the wide surface of the equipment substrate Bm. The input terminal 40, the output terminal 41, and the device connector 42 are disposed on the wide surface of the device substrate Bs. The device substrate Bs functions as a second substrate.

With reference to FIG. 1, operations of the electrical equipment 10 and the switch device 11 will be described. In the following, the positive electrode voltage of the direct current power supply 20 with respect to the potential of the negative electrode, or in other words, the potential of the body E, as a reference potential will be referred to as a power supply voltage. Since the ground terminal 31 is connected to the body E, the power supply voltage is a positive voltage with respect to the potential of the ground terminal 31 as a reference potential. When the power switch 21 is on, a current flows, from the positive electrode of the direct current power supply 20, through the power switch 21, the power supply terminal 30, the regulator 34, the ground terminal 31, the body E, and the negative electrode of the direct current power supply 20 in this order. Thus, the power supply voltage of the direct current power supply 20 is applied to the regulator 34, thus supplying power to the regulator 34. The regulator 34 is activated while power is supplied thereto.

The regulator 34 lowers the power supply voltage to a constant target voltage. The regulator 34 applies the target voltage obtained by the voltage lowering to the microcomputer 35. The target voltage is a voltage with respect to the potential of the ground terminal 31 as a reference potential. The power supply voltage is 12 V, for example. The target voltage is 3.3 V or 5.5 V or the like. When the regulator 34 applies the target voltage to the microcomputer 35, a current flows, from the positive electrode of the direct current power supply 20, through the power switch 21, the power supply terminal 30, the regulator 34, the microcomputer 35, the ground terminal 31, the body E, and the negative electrode of the direct current power supply 20 in this order, thus supplying power to the microcomputer 35. The microcomputer 35 is activated while power is supplied thereto.

When the power switch 21 is switched off, the flow of a current via the regulator 34 is stopped. Thus, the supply of power from the direct current power supply 20 to the regulator 34 is stopped. When the supply of power from the direct current power supply 20 to the regulator 34 is stopped, the regulator 34 is deactivated. When the regulator 34 is deactivated, the flow of a current via the microcomputer 35 is stopped. Thus, the supply of power from the direct current power supply 20 to the microcomputer 35 is stopped. When the supply of power from the direct current power supply 20 to the microcomputer 35 is stopped, the microcomputer 35 is deactivated.

While the power supplied to the drive circuit 44 of the switch device 11 is less than a predetermined power, the drive circuit 44 is deactivated. While the power supplied to the drive circuit 44 is greater than or equal to the predetermined power, the drive circuit 44 is activated.

For each of the connection switch 36 and the circuit switch 50, when the state is on, the resistance value between the collector and the emitter is sufficiently small. Accordingly, a current can flow through the collector and the emitter in this order. For each of the connection switch 36 and the circuit switch 50, when the state is off, the resistance value between the collector and the emitter is sufficiently large. Accordingly, no current flows via the collector and the emitter. The switching circuit 33 switches the connection switch 36 on or off according to the voltage of the ground line G with respect to the potential of the ground terminal 31 as a reference potential.

In the case where the power switch 21 is on, when the connection switch 36 is on, a current flows, from the positive electrode of the direct current power supply 20, through the power switch 21, the input terminal 40, the drive circuit 44, the device connector 42, the ground line G, the equipment connector 32, the connection switch 36, the ground terminal 31, the body E, and the negative electrode of the direct current power supply 20 in this order. Through this flow of a current, power greater than or equal to the predetermined power is supplied to the drive circuit 44. When the connection switch 36 is on, a current flows through the collector and the emitter in this order in the connection switch 36. Accordingly, the collector of the connection switch 36 functions as an input end into which a current is input. The emitter of the connection switch 36 functions as an output end from which a current is output.

In the case where the power switch 21 is on, when the connection switch 36 is off, a current flows, from the positive electrode of the direct current power supply 20, through the power switch 21, the input terminal 40, the drive circuit 44, the device connector 42, the ground line G, the equipment connector 32, the second circuit resistor 52, the ground terminal 31, the body E, and the negative electrode of the direct current power supply 20 in this order. Since a current flows via the second circuit resistor 52, the power supplied to the drive circuit 44 is small. Consequently, through the flow of a current via the drive circuit 44 and the second circuit resistor 52, the power supplied to the drive circuit 44 is less than the predetermined power.

For the power feeding switch 43, when the voltage of the gate with respect to the potential of the source as a reference potential is greater than or equal to a predetermined voltage, the state is on. When the voltage of the gate with respect to the potential of the source as a reference potential is less than a predetermined voltage, the state of the power feeding switch 43 is off. The microcomputer 35 of the electrical equipment 10 outputs a high-level voltage or a low-level voltage to the drive circuit 44 of the switch device 11 via the signal line F. The output voltage of the microcomputer 35 is a voltage with respect to the potential of the ground terminal 31 as a reference potential. The microcomputer 35 functions as an electronic component.

The microcomputer 35 switches the output voltage to be output to the drive circuit 44 via the signal line F to a low-level voltage or a high-level voltage. The drive circuit 44 detects a voltage of the signal line F with respect to the potential of the ground line G as a reference potential. When the connection switch 36 is on, the potential of the ground line G substantially matches the potential of the ground terminal 31, or in other words, a ground potential. Accordingly, the voltage of the signal line F that is detected by the drive circuit 44 is an output voltage of the microcomputer 35.

In the case where the connection switch 36 is on, when the microcomputer 35 switches the output voltage from a low-level voltage to a high-level voltage, the drive circuit 44 raises the voltage of the gate of the power feeding switch 43 with respect to the potential of the ground line G as a reference potential. Thus, in the power feeding switch 43, the voltage of the gate with respect to the potential of the source as a reference potential is raised to a value greater than or equal to the predetermined voltage, and the power feeding switch 43 is switched on.

In a similar case, when the microcomputer 35 switches the output voltage from a high-level voltage to a low-level voltage, the drive circuit 44 lowers the voltage of the gate of the power feeding switch 43 with respect to the potential of the ground line G as a reference potential. Thus, in the power feeding switch 43, the voltage of the gate with respect to the potential of the source as a reference potential is lowered to a value less than the predetermined voltage, and the power feeding switch 43 is switched off.

When the switching circuit 33 switches the connection switch 36 from on to off, the flow of a current via the ground line G, the connection switch 36, and the ground terminal 31 is stopped.

For the connection switch 36, when the voltage of the base with respect to the potential of the emitter as a reference potential is greater than or equal to a predetermined threshold, the state is on. The threshold is a positive value. When the voltage of the base with respect to the potential of the emitter as a reference potential is less than the threshold, the state is off. Accordingly, the connection switch 36 is switched from on to off when the voltage of the base with respect to the potential of the emitter as a reference potential is lowered to a value less than the threshold. The base of the connection switch 36 functions as a control end.

For the circuit switch 50, when the voltage of the base with respect to the potential of the emitter as a reference potential is greater than or equal to a predetermined reference voltage, the state is on. When the voltage of the base with respect to the potential of the emitter as a reference potential is less than the reference voltage, the state is off. The reference voltage is a positive value. As stated above, the emitter of the circuit switch 50 is connected to the ground terminal 31. The base of the circuit switch 50 is connected to the ground line G. Accordingly, in relation to the circuit switch 50, the voltage of the base with respect to the potential of the emitter as a reference potential is the voltage of the ground line G with respect to the potential of the ground terminal 31 as a reference potential. Accordingly, the circuit switch 50 is switched from off to on when the voltage of the ground line G with respect to the potential of the ground terminal 31 as a reference potential is raised to a value greater than or equal to the reference voltage. The voltage of the ground line G matches the voltage of a portion of the equipment connector 32 that is conductively connected to the ground line G. Accordingly, the voltage of the ground line G corresponds to the voltage of the equipment connector 32.

Figure 3:
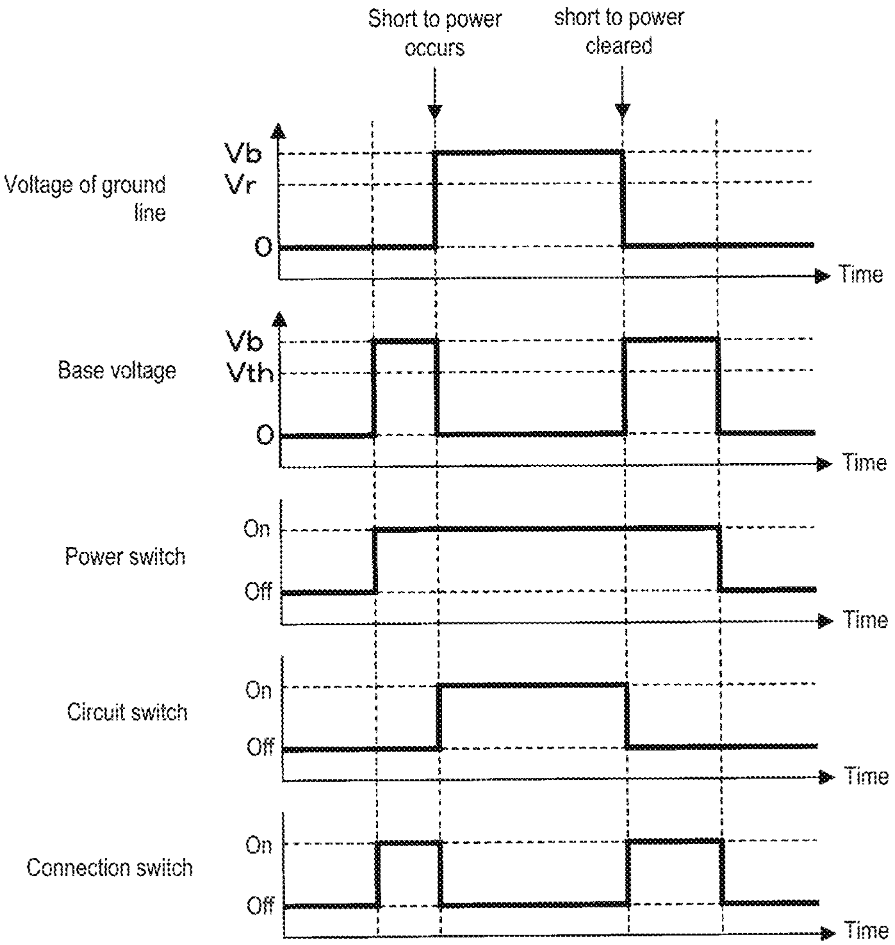
FIG. 3 is a timing chart for illustrating an operation of a switching circuit.

FIG. 3 is a timing chart for illustrating an operation of the switching circuit 33. In relation to the connection switch 36, the voltage of the base with respect to the potential of the ground terminal 31 as a reference potential is referred to as a base voltage. FIG. 3 shows transitions of the base voltage and the voltage of the ground line G. The reference potential of the voltage of the ground line G is the potential of the ground terminal 31, or in other words, the potential of the body E. As stated above, the voltage of the ground line G corresponds to the voltage of the equipment connector 32. FIG. 3 shows transitions of the states of the power switch 21, the circuit switch 50, and the connection switch 36. Vb denotes the power supply voltage of the direct current power supply 20. Vth and Vr denote the threshold and the reference voltage, respectively. As stated above, when the ground terminal 31 is connected to the body E, the power supply voltage is a positive voltage with respect to the potential of the ground terminal 31 as a reference potential.

As shown in FIG. 2, the ground line G is disposed between the equipment substrate Bm and the device substrate Bs. Accordingly, the ground line G may come into contact with a conductive wire connected to the positive electrode of the direct current power supply 20. When the ground line G comes into contact with the conductive wire, the ground line G may be connected to the positive electrode of the direct current power supply 20. A phenomenon in which the ground line G is connected to the positive electrode of the direct current power supply 20 is called a short to power. When a short to power of the ground line G occurs, the voltage of the ground line G is raised to the power supply voltage Vb.

When the power switch 21 is off, no current will flow via the second circuit resistor 52. Accordingly, the voltage of the ground line G is 0 V. As shown in FIG. 3, when the voltage of the ground line G is 0 V, the voltage of the ground line G is less than the reference voltage Vr. Accordingly, while the voltage of the ground line G is 0 V, the circuit switch 50 is off. When the power switch 21 and the circuit switch 50 are off, no current will flow via the regulator 34 and the first circuit resistor 51. Accordingly, the base voltage of the connection switch 36 is 0 V, which is less than the threshold Vth, and the connection switch 36 is off. When the power switch 21 is switched from off to on, the power supply voltage Vb is applied to one end of the first circuit resistor 51 via the power switch 21.

When the circuit switch 50 is off, almost no current flows via the first circuit resistor 51. Accordingly, when the power switch 21 is switched from off to on, the base voltage of the connection switch 36 is raised to the power supply voltage Vb. Since the threshold Vth is less than or equal to the power supply voltage Vb, the connection switch 36 is switched from off to on when the base voltage of the connection switch 36 is raised to the power supply voltage Vb. As stated above, when the connection switch 36 is on, the potential of the ground line G substantially matches the potential of the ground terminal 31, or in other words, the ground potential.

When a short to power of the ground line G occurs, the voltage of the ground line G is raised to the power supply voltage Vb. Since the power supply voltage Vb is greater than or equal to the reference voltage Vr, the circuit switch 50 is switched from off to on when the voltage of the ground line G is raised to the power supply voltage Vb. When the circuit switch 50 is switched on, the base voltage of the connection switch 36 is lowered to 0 V, which is less than the threshold Vth. Thus, the connection switch 36 is switched from on to off.

When the connection switch 36 is off, no current will flow via the ground line G and the connection switch 36. A current flows through the ground line G, the equipment connector 32, the second circuit resistor 52, and the ground terminal 31 in this order. Since a current flows via the second circuit resistor 52, the current flowing into the electrical equipment 10 via the ground line G is small. The inflow of an overcurrent into the electrical equipment 10 via the ground line G is prevented. The resistance value of the second circuit resistor 52 is sufficiently larger than the resistance value between the collector and the emitter of the connection switch 36 in the on state.

While the voltage of the ground line G is greater than or equal to the reference voltage Vr, the connection switch 36 is kept off. When a short to power of the ground line G is cleared in a state in which the power switch 21 is on, a current flows, from the positive electrode of the direct current power supply 20, through the power switch 21, the input terminal 40, the drive circuit 44, the device connector 42, the ground line G, the equipment connector 32, the second circuit resistor 52, the ground terminal 31, the body E, and the negative electrode of the direct current power supply 20 in this order. Thus, the voltage of the ground line G is lowered to a voltage less than the reference voltage Vr. As a result, the circuit switch 50 is switched from on to off.

When the circuit switch 50 is switched off, the base voltage of the connection switch 36 is raised to the power supply voltage Vb, and the connection switch 36 is switched from off to on. When the connection switch 36 is switched on, the voltage of the ground line G is lowered to 0 V. The resistance value of the second circuit resistor 52 is a value at which the voltage of the ground line G is lowered to a voltage less than the reference voltage Vr when a current flows, from the positive electrode of the direct current power supply 20, through the power switch 21, the input terminal 40, the drive circuit 44, the device connector 42, the ground line G, the equipment connector 32, the second circuit resistor 52, the ground terminal 31, the body E, and the negative electrode of the direct current power supply 20 in this order.

When the power switch 21 is switched off, no current will flow via the regulator 34 and the first circuit resistor 51. Accordingly, the base voltage of the connection switch 36 is lowered to 0 V, which is less than the threshold Vth, and the connection switch 36 is switched off. When a short to power of the ground line G occurs, the voltage of the ground line G is the power supply voltage Vb, regardless of the state of the power switch 21. Accordingly, while a short to power of the ground line G occurs, the circuit switch 50 and the connection switch 36 are kept on and off, respectively.

Effects of Electrical Equipment 10

As stated above, the switching circuit 33 switches the connection switch 36 from on to off when the voltage of the ground line G with respect to the potential of the ground terminal 31 as a reference potential is raised to a value greater than or equal to the reference voltage. Accordingly, when a short to power of the ground line G occurs, the connection switch 36 is switched from on to off, thus preventing the inflow of an overcurrent into the electrical equipment 10 via the ground line G. Since the equipment substrate Bm is connected to the device substrate Bs of the switch device 11 by the ground line G, it is highly likely that a short to power of the ground line G occurs. Accordingly, there is a high need for the function for preventing the inflow of an overcurrent via the ground line G.

The switching performed by the switching circuit 33 does not use a processing element configured to execute processing according to a program. The switching circuit 33 is constituted by hardware. Accordingly, the period of time needed until the connection switch 36 is switched from on to off after the voltage of the ground line G with respect to the potential of the ground terminal 31 as a reference potential has been raised to a value greater than or equal to the reference voltage is short.

When the power switch 21 and the circuit switch 50 are on and off, respectively, a current flows, from the positive electrode of the direct current power supply 20, through the power switch 21, the power supply terminal 30, the first circuit resistor 51, the connection switch 36, the ground terminal 31, the body E, and the negative electrode of the direct current power supply 20 in this order. In the connection switch 36, a current flows through the base and the emitter in this order. Since this current is close to 0 A, the current flowing via the circuit switch 50 is substantially 0 A. However, while a voltage is applied to the base of the connection switch 36, power is consumed in the connection switch 36. When the switch device 11 is deactivated, switching the power switch 21 to off can stop the application of a voltage to the base of the connection switch 36.

Modifications of Embodiment 1

In Embodiment 1, the load 22 is disposed outside the switch device 11. However, the location where the load 22 is disposed is not limited to outside the switch device 11. For example, the switch device 11 may include the load 22. In this case, the load 22 is disposed, for example, on the wide surface of the device substrate Bs of the switch device 11.

The power feeding switch 43 of the switch device 11 may be any switch that can be switched by the drive circuit 44. Accordingly, the power feeding switch 43 is not limited to an N-channel FET, and may be a P-channel FET, a bipolar transistor, or a relay contact or the like. The device connected to the electrical equipment 10 may be any device that performs an operation according to the output voltage of the microcomputer 35. Accordingly, the device connected to the electrical equipment 10 is not limited to the switch device 11.

Embodiment 2

The electrical equipment 10 according to Embodiment 1 outputs a voltage to the switch device 11 via the signal line F. However, the operation performed by the electrical equipment 10 is not limited to outputting a voltage.

In the following, aspects in which Embodiment 2 differs from Embodiment 1 will be described. Components of Embodiment 2 other than those described below are the same as those of Embodiment 1. Therefore, constituent parts that are the same as those of Embodiment 1 are denoted by the same reference numerals as Embodiment 1, and the description of the constituent parts has been omitted.

Configuration of In-Vehicle System 1

Figure 4:
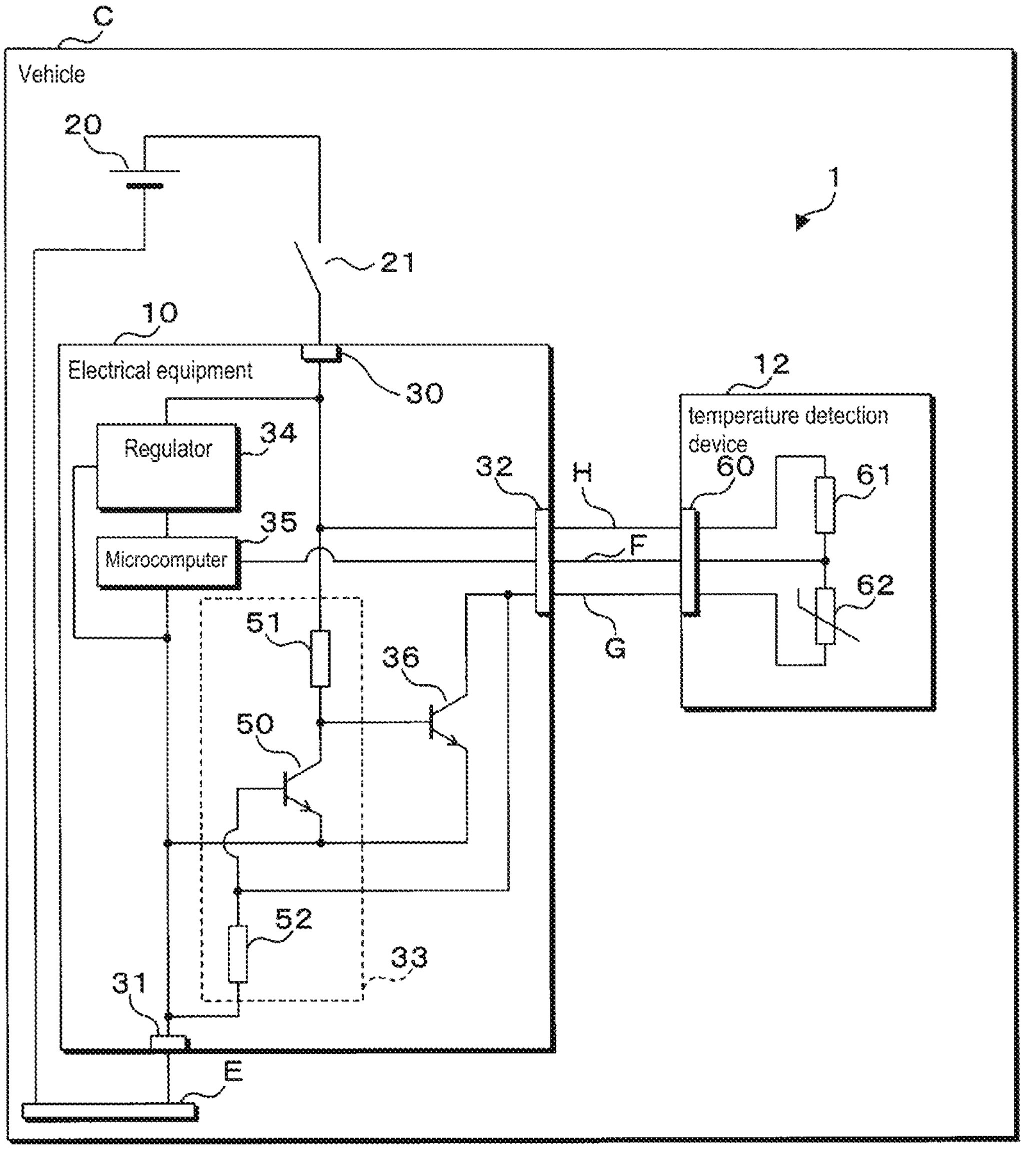
FIG. 4 is a block diagram showing the configuration of a relevant portion of an in-vehicle system according to Embodiment 2.

FIG. 4 is a block diagram showing the configuration of a relevant portion of an in-vehicle system 1 according to Embodiment 2. Embodiment 2 is different from Embodiment 1 with regard to a device connected to the electrical equipment 10. The in-vehicle system 1 according to Embodiment 2 includes a temperature detection device 12 in place of the switch device 11. The temperature detection device 12 is mounted in the vehicle C. The temperature detection device 12 includes a second device connector 60. In Embodiment 2, the temperature detection device 12 functions as external equipment and second electrical equipment.

As stated in the description of Embodiment 1, the equipment connector 32 of the electrical equipment 10 is detachably connected to one end of each of the signal line F and the ground line G. The equipment connector 32 is further detachably connected to one end of a voltage line H. The other end of each of the voltage line H, the signal line F, and the ground line G is detachably connected to the second device connector 60 of the temperature detection device 12. The voltage line H is a conductive wire.

The temperature detection device 12 detects a temperature in the interior of the vehicle C, or a temperature of a semiconductor switch or the like. The temperature detection device 12 outputs a voltage indicating the detected temperature to the electrical equipment 10.

Configurations of Electrical Equipment 10 and Temperature Detection Device 12

In the electrical equipment 10, a connection node between the power supply terminal 30 and the first circuit resistor 51 of the switching circuit 33 is connected to the equipment connector 32. This connection node is connected to the voltage line H via the equipment connector 32.

The temperature detection device 12 includes a fixed resistor 61 and a thermistor 62, in addition to the second device connector 60. The resistance value of the fixed resistor 61 is constant regardless of the temperature of the fixed resistor 61. The resistance value of the thermistor 62 varies depending on the temperature of the thermistor 62. When the type of the thermistor 62 is a negative temperature coefficient (NTC), the resistance value of the thermistor 62 increases with an increase in the temperature of the thermistor 62. When the type of the thermistor 62 is a positive temperature coefficient (PTC), the resistance value of the thermistor 62 decreases with an increase in the temperature of the thermistor 62.

The thermistor 62 can be used to detect the environmental temperature around the thermistor 62. Accordingly, in the case of detecting a temperature in the interior of the vehicle C, the thermistor 62 is disposed in the interior of the vehicle C. In the case of detecting a temperature of the semiconductor switch, the thermistor 62 is disposed in the vicinity of the semiconductor switch.

One end of the fixed resistor 61 is connected to the second device connector 60. The other end of the fixed resistor 61 is connected to one end of the thermistor 62. The other end of the thermistor 62 is connected to the second device connector 60. A connection node between the fixed resistor 61 and the thermistor 62 is connected to the second device connector 60.

One end of the fixed resistor 61 is connected to the voltage line H via the second device connector 60. The connection node between the fixed resistor 61 and the thermistor 62 is connected to the signal line F via the second device connector 60. The other end of the thermistor 62 is connected to the ground line G via the second device connector 60.

Note that the temperature detection device 12 may include a device substrate Bs as in the case of the switch device 11 of Embodiment 1. In this case, the second device connector 60, the fixed resistor 61, and the thermistor 62 are disposed on a wide surface of the device substrate Bs.

As stated in the description of Embodiment 1, in the case where the power switch 21 is on, the switching circuit 33 keeps the connection switch 36 on when no short to power of the ground line G occurs. When the power switch 21 and the connection switch 36 are on, a current flows, from the positive electrode of the direct current power supply 20, through the power switch 21, the power supply terminal 30, the equipment connector 32, the voltage line H, the second device connector 60, the fixed resistor 61, the thermistor 62, the second device connector 60, the ground line G, the equipment connector 32, the circuit switch 50, the ground terminal 31, the body E, and the negative electrode of the direct current power supply 20 in this order. Thus, the power supply voltage of the direct current power supply 20 is applied between one end of the fixed resistor 61 and the other end of the thermistor 62 via the voltage line H and the ground line G.

When the power supply voltage of the direct current power supply 20 is applied between one end of the fixed resistor 61 and the other end of the thermistor 62, the fixed resistor 61 and the thermistor 62 divide the power supply voltage. The divided voltage obtained by the voltage division is output from the temperature detection device 12 to the microcomputer 35 of the electrical equipment 10 via the signal line F. The divided voltage is a voltage with respect to the potential of the ground line G as a reference potential.

In Embodiment 1, the microcomputer 35 outputs a high-level voltage or a low-level voltage via the signal line F. In Embodiment 2, the microcomputer 35 detects a voltage of the signal line F with respect to the potential of the ground terminal 31 as a reference potential, instead of outputting a voltage. When the connection switch 36 is on, the voltage detected by the microcomputer 35 substantially matches the divided voltage.

The divided voltage increases with an increase in the resistance value of the thermistor 62. As stated above, the resistance value of the thermistor 62 varies depending on the temperature of the thermistor 62. Therefore, the divided voltage indicates the temperature of the location where the thermistor 62 is disposed.

In Embodiment 2 as well, when a short to power of the ground line G is cleared in a state in which the power switch 21 and the connection switch 36 are on and off, respectively, a current flows, from the positive electrode of the direct current power supply 20, through the power switch 21, the power supply terminal 30, the equipment connector 32, the voltage line H, the second device connector 60, the fixed resistor 61, the thermistor 62, the second device connector 60, the ground line G, the equipment connector 32, the second circuit resistor 52, the ground terminal 31, the body E, and the negative electrode of the direct current power supply 20 in this order. In this case, the resistance value of the second circuit resistor 52 is adjusted such that the voltage of the ground line G with respect to the potential of the ground terminal 31 as a reference potential is lowered to a value less than the reference voltage Vr. Therefore, the resistance value of the second circuit resistor 52 is less than the minimum value of a combined resistance value of the fixed resistor 61 and the thermistor 62.

Effects of Electrical Equipment 10

The electrical equipment 10 according to Embodiment 2 similarly achieves the effects achieved by the electrical equipment 10 according to Embodiment 1.

Modifications of Embodiment 2

In Embodiment 2, the locations to which the fixed resistor 61 and the thermistor 62 are respectively connected may be interchanged. In this case, one end of the fixed resistor 61 is connected to the ground line G. The other end of the thermistor 62 is connected to the voltage line H. When the locations to which the fixed resistor 61 and the thermistor 62 are respectively connected are interchanged, the divided voltage decreases with an increase in the resistance value of the thermistor 62.

The voltage applied to a circuit including the fixed resistor 61 and the thermistor 62 is not limited to the power supply voltage, and may be, for example, a target voltage generated by the regulator 34. In this case, in place of the connection node between the power supply terminal 30 and the first circuit resistor 51, a connection node between the regulator 34 and the microcomputer 35 is connected to the voltage line H via the equipment connector 32. The fixed resistor 61 and the thermistor 62 divide the target voltage. The device connected to the electrical equipment 10 may be any device that outputs a voltage or a signal to the electrical equipment 10. Therefore, the device connected to the electrical equipment 10 is not limited to the temperature detection device 12.

Modifications of Embodiments 1 and 2

In Embodiments 1 and 2, the connection switch 36 is not limited to an NPN bipolar transistor, and may be an N-channel FET or an insulated gate bipolar transistor (IGBT) or the like. Similarly, the circuit switch 50 is not limited to an NPN bipolar transistor, and may be an N-channel FET or an IGBT or the like. The power supply terminal 30 of the electrical equipment 10 may be connected directly to the positive electrode of the direct current power supply 20.

The configuration of the switching circuit 33 may be any configuration in which the voltage of the ground line G with respect to the potential of the ground terminal 31 as a reference potential switches the connection switch 36 on or off according to the reference voltage. Accordingly, the configuration of the switching circuit 33 is not limited to a configuration including the circuit switch 50, the first circuit resistor 51, and the second circuit resistor 52. When the configuration of the switching circuit 33 is different from a configuration including the circuit switch 50, the first circuit resistor 51, and the second circuit resistor 52, the connection switch 36 may be a relay contact.

The technical features (constituent elements) described in Embodiments 1 and 2 can be combined with each another, and such combination can form a new technical feature.

It should be appreciated that Embodiments 1 and 2 disclosed herein are to be construed in all respects as illustrative and not limiting. The scope of the present disclosure is defined by the claims, rather than by the description preceding them, and is intended to include all modifications which fall within the scope of the claims and the meaning and scope of equivalents thereof.

The invention claimed is:

1. Electrical equipment configured to be mounted in a vehicle, comprising:

a first connection unit configured to be connected to a body of the vehicle;

a second connection unit configured to be connected to an external equipment;

a switch configured to be connected between the first connection unit and the second connection unit; and a switching circuit configured to switch the switch on or off, wherein, when the switch is on, a current flows through the second connection unit, the switch, and the first connection unit in this order, the switching circuit switches the switch from on to off when a voltage between the first connection unit and the second connection unit is greater than or equal to a predetermined voltage, wherein the electrical equipment and the external equipment form a parallel circuit as a result of a conductive wire connected to the first connection unit being connected to a positive electrode of a direct current power supply, causing the conductive wire to rise in potential and thereby causing the voltage between the first and second connection units to reach the predetermined voltage.

2. The electrical equipment according to claim 1, further including an electronic component configured to output or detect a voltage with respect to a potential of the first connection unit as a reference potential.

3. The electrical equipment according to claim 2, further comprising:

a substrate on which the switch and the switching circuit are disposed, wherein the substrate is connected to the external equipment.

4. The electrical equipment according to claim 2, wherein the switch is switched from on to off when a voltage between an output end from which a current is output, and a control end is less than a threshold, the switching circuit includes a second switch configured to be connected between the output end and the control end of the switch, and the second switch is switched from off to on when the voltage between the first connection unit and the second connection unit is greater than or equal to the predetermined voltage.

5. The electrical equipment according to claim 1, further comprising:

a substrate on which the switch and the switching circuit are disposed, wherein the substrate is connected to the external equipment.

6. The electrical equipment according to claim 5, wherein the switch is switched from on to off when a voltage between an output end from which a current is output, and a control end is less than a threshold, the switching circuit includes a second switch configured to be connected between the output end and the control end of the switch, and the second switch is switched from off to on when the voltage between the first connection unit and the second connection unit is greater than or equal to the predetermined voltage.

7. The electrical equipment according to claim 1, wherein the switch is switched from on to off when a voltage between an output end from which a current is output, and a control end is less than a threshold, the switching circuit includes a second switch configured to be connected between the output end and the control end of the switch, and the second switch is switched from off to on when the voltage between the first connection unit and the second connection unit is greater than or equal to the predetermined voltage.

8. An in-vehicle system comprising: electrical equipment; and second electrical equipment, the electrical equipment being configured to output a voltage to the second electrical equipment, or the second electrical equipment being configured to output a voltage to the electrical equipment, wherein the electrical equipment includes:

a first connection unit configured to be connected to a body of a vehicle;

a second connection unit configured to be connected to the second electrical equipment;

a switch configured to be connected between the first connection unit and the second connection unit; and a switching circuit configured to switch the switch on or off, wherein, when the switch is on, a current flows through the second connection unit, the switch, and the first connection unit in this order, the switching circuit switches the switch from on to off when a voltage between the first connection unit and the second connection unit is greater than or equal to a predetermined voltage, wherein the electrical equipment and the second electrical equipment form a parallel circuit as a result of a conductive wire connected to the first connection unit being connected to a positive electrode of a direct current power supply, causing the conductive wire to rise in potential and thereby causing the voltage between the first and second connection units to reach the predetermined voltage.

9. The in-vehicle system according to claim 8, wherein the electrical equipment includes a substrate on which the switch and the switching circuit are disposed, the second electrical equipment includes a second substrate, and the substrate is connected to the second substrate.

* * * * *